INVENTOR.
DONALD J. PLAZEK

Nov. 1, 1966

JAMES E. WEBB  
ADMINISTRATOR OF THE NATIONAL AERONAUTICS  
AND SPACE ADMINISTRATION  
INSTRUMENT FOR MEASURING TORSIONAL CREEP AND RECOVERY 3,282,091

Filed Oct. 29, 1963

INVENTOR.  
DONALD J. PLAZEK

BY  
*G. H. O'Brien*  
*Norman T. Musial*  
ATTORNEYS 3,282,091
INSTRUMENT FOR MEASURING TORSIONAL
CREEP AND RECOVERY
James E. Webb, Administrator of the National Aeronautics and Space Administration, with respect to an invention of Donald J. Plazek
Filed Oct. 29, 1963, Ser. No. 319,905
8 Claims. (Cl. 73—99)

The invention described herein may be manufactured and used by or for the Government of the United States of America for governmental purposes without the payment of any royalties thereon or therefor.

The invention relates generally to a material property measuring instrument and, more particularly, to an instrument for measuring material creep and recovery.

In space applications where high reliability is desirable, it becomes necessary to have all the environmental physical data on materials utilized so as to provide for proper design of spacecraft components. Among these data is material shear-creep compliance. The sheer-creep compliance of a material whether it be solid or liquid is the amount of permanent and/or elastic deformation over an extended period of time due to static loading. Such deformation takes place in addition to that normally present initially due to tension or compressive loading.

In known material creep and recovery instruments, a stress is applied to a previously relaxed sample at some time, $T_0$, and held constant until at some later time, $T\theta$, the stress is removed. If the sample is isotropic and linearly viscoelastic, its deformation increases in the direction of the applied stress as a function of time until $T\theta$, and recovers in the opposite direction partially or completely depending on whether its steady state viscosity is operationally finite or infinite. However, when material creep measurements are made at low force levels, even small amounts of friction or residual forces can cause appreciable errors in these measurements. It has been observed that during recovery the disturbing forces do not remain small compared to the desired driving force as they do during creep. Here the desired driving force, supplied only by the sample, is an ever decreasing quantity and eventually becomes smaller than the residual. What in fact is then being measured are the errors or inaccuracy of the measuring instrument rather than the material sample itself. This problem becomes more severe for materials that have considerable fluidity.

Accordingly, an object of the invention is to provide a new and improved instrument for measuring shear-creep compliance of materials to a high degree of accuracy.

Another object of the instant invention is to provide a new and improved instrument having the capability of providing residual error free shear-creep measurements of materials.

Still another object of the instant invention is to provide for a minimization of friction and undesirable residual torques in a material shear-creep measurement instrument.

Briefly, in accordance with one embodiment of this invention, these and other objects are attained by placing a material specimen whose shear-creep compliance is to be measured between a solid cylinder disposed in a first housing and a float, the float having one end of a coupling rod secured thereto and being supported by a fluid contained in an enclosure of a second housing. Alignment of the float with the cylinder is provided by the specimen itself. The other end of the coupling rod has a metal disc and mirror connected thereto. A torque is imparted to the specimen through the float by imparting a rotational force to the disc through a drive mechnaism arrangement which provides for the selective interaction of eddy currents and magnetic field imparted on the disc. The angle of twist of the specimen is indicated by the displacement of a light beam reflected by the mirror. Material shear-creep compliance is determined by correlating the angle of twist with the applied torque.

In another embodiment of the invention where the material specimen is a dilute solution such as a solution having less than one percent polymer by weight dissolved therein, the specimen itself is utilized as the fluid in the enclosure. Centering of the float is obtained by magnets appropriately secured to the cylinder and the float.

A more complete appreciation of the invention and many of the attendant advantages thereof will be readily apparent as the same becomes better understood by reference to the following detailed description when considered in connection with the accompanying drawings wherein.

Figure 1:
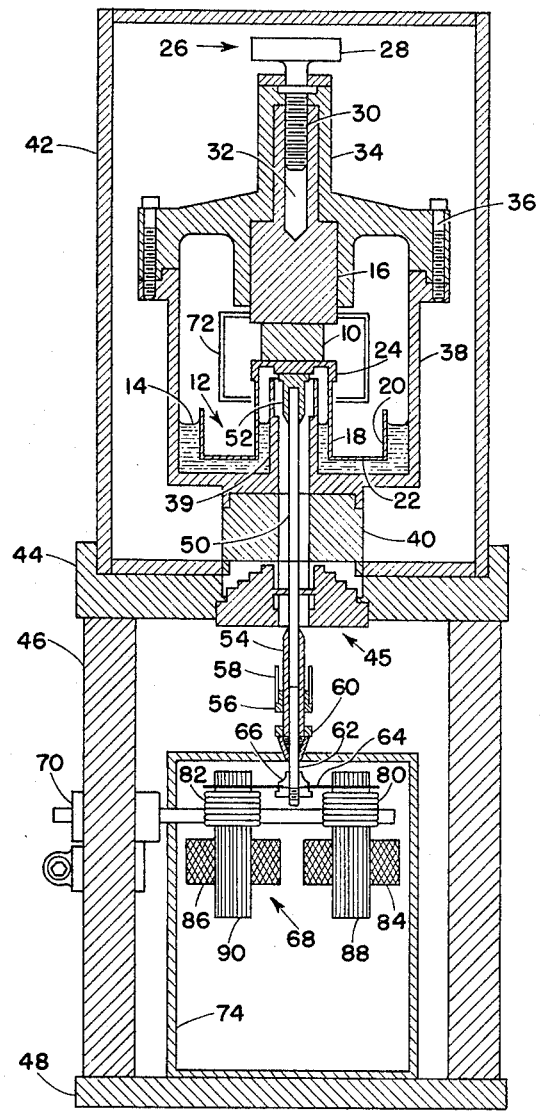
FIG. 1 is an elevation view of the invention in cross section.

Referring now to the drawings wherein like reference characters designate identical or corresponding parts throughout the several views, and more particularly to FIG. 1 thereof whereon the present invention is shown as consisting essentially of a material specimen 10 supported by a float 12. The float is buoyed up by supporting liquid 14. The buoyant force of the supporting liquid 14 against the float 12 forces the specimen 10 against solid cylinder 16. The float 12 consists of an inner cylinder 18 and outer cylinder 20, the inner cylinder being slightly the longer. The inner and outer cylinders are integrally connected by an annulus 22 thereby forming an annular cup.

The unconnected upper end of the inner cylinder is fitted with a cover 24 on which the specimen 10 rests. For purposes of optimal accuracy, the float 12 should be made of as light a material as possible. It is, therefore, preferential to have the float 12 made out of aluminum.

The solid cylinder 16 can be elevated or lowered by an adjusting means which comprises an adjusting member 26 having a handle 28 with an elongated threaded portion 30 extending into a threaded hole 32 centrally located in the upper portion of solid cylinder 16. The combination of the adjusting member 26 and cylinder 16 is disposed in an upper housing 34. The upper housing 34 is integrally attached by bolts 36 to a lower housing 38 which has as its lower end an annular container 39 for containing the supporting liquid 14.

The lower housing 38 rests on support 40. The upper housing 34 and lower housing 38 are surrounded by a first double-walled thermostating jacket 42 which rests on a first base 44. Fluid at a controlled temperature may be passed through the jacket or a resistance type heater may be employed to provide for a controlled environment.

A conventional jewelers clamp assembly 45 is integrally connected to first base 44.

Three support columns 46 are integral with the first base 44 and a second base 48. A coupling rod 50 is cemented into two end fixtures 52 and 54. The coupling rod 50 can be made from glass-bonded mica.

The first end fixture 52 is securely connected to the cover 24 of float 12. A first clamp 56 holds a plurality of mirrors 58 onto second fixture 54. A second clamp 60 holds an axial rod 62 which is connected to a disc 64 through third clamp 66 to the rod 50.

A drive assembly 68 is connected to a support column 46 through a fourth clamp 70. The drive assembly 68 induces a torque in disc 64. The drive assembly 68 does not physically touch the disc 64. In the present embodiment, it is preferable that disc 64 be made of aluminum although other materials can be used.

For optimal results, the float 12 should be buoyed up by a supporting fluid of extremely low volatility, low viscosity and high density. An example of the type of fluid which is used is tri-m-tolyl phosphate. Mercury is also an ideal fluid which is used. In order to overcome possible errors which may occur due to oxides which form on the surface of the mercury, the environment within the first thermostating jacket 42 can be inerted with argon, nitrogen or a similar inert gas.

It is necessary to obtain a constant sample height during measurement of creep compliance. Because of the weight of the float 12 and first end fixture 52 attached thereto, both of which are supported by the supporting liquid 14, serious continuing changes can occur if the level of the liquid 14 is too low or too high and the material specimen 10 has a finite but high viscosity. To eliminate these height changes, the material specimen 10 is placed on the float 12 and the system is allowed to come to its equilibrium level. The coupling rod 50 is then clamped using the jewelers chuck assembly 45. The cylinder 16 is lowered to contact material specimen 10 by turning adjusting member 26 counterclockwise. Cylinder 16 is lowered until material specimen 10 is compressed about 5%. Compression can be maintained for a few minutes or overnight, depending upon how readily the sample attaches itself to the metal surfaces. No adhesive is or need be used. The jewelers chuck assembly 45 is then loosened and material specimen 10 is allowed to relax. In relaxing from its compressed state, the sample 10 pushes the float 12 down. After a few minutes, the cylinder 16 is raised by turning adjusting member clockwise until the float 12 is again in its equilibrium position. The specimen height is monitored through a window 72 in the first thermostating jacket 42. Specimen heights need be read to within a few microns to maintain reasonable specimen coefficient accuracy. This precision can be accomplished by using a traveling microscope with a relay lense system. Fifty power magnification can be obtained at a working distance of 7½ inches with such a microscope.

In order to maintain necessary accuracy in measuring the creep compliance, the temperature of the sample 10 must be kept constant. To accomplish this, thermostated liquid is pumped through the thermostating jacket 42. By controlling the liquid through the thermostating jacket 42, the temperatures measured by a thermocouple (not shown) near the sample, are held constant to a few hundredths of a degree. A second thermostating jacket 74 can be placed around the drive mechanism 68 to assure repeatability in induced torques within 0.1 percent. To provide additional tempearture control, an insulating chamber can be placed over the entire unit (such chamber is not shown in FIG. 1). Temperatures can be maintained as low as minus 10° C.

A torque is induced for a given time, T$\theta$, in the sample 10 by the drive assembly 68 through the coupling rod 50. The angle of twist is measured by a light beam reflected off the mirror 58.

A photo recorder can be used to follow the light beam and record its position. In operation, a reflected light beam has been utilized at an effective length of ten feet and at this distance the response to the recorder is sufficient to resolve the angle of twist of material specimen 10 to about a thousandth of a degree.

The shear creep compliance, J($t$), can be calculated from the torsional deformation of a right circular cylinder by the following formula:

$$J(t) = \frac{\pi r^4 \theta(t)}{2hs}$$

where $r$ is the radius and $h$ is the height of the sample, applied torque in dyne centimeter is $s$, and the angle of twist, $\theta(t)$, is a function of time, $t$. Since $J(t) = t/n$ when the deformation is completely viscous, the viscosity $n$ is equal to $2hst/\pi r^4 \theta(t)$.

The materials with viscosities greater than 10 million poises are herein called solids because they are handled as such and hold their shape. Included in this group which can be measured with the invention are linear amorphous polymers, rubbers and gels. The arrangement for holding these solid samples is shown in FIG. 2A wherein the cylindrical sample 10 resides between the cylinder 16 and the float 12 whereby the sample provides its own centering with respect to the lower housing 38.

Figure 2C:
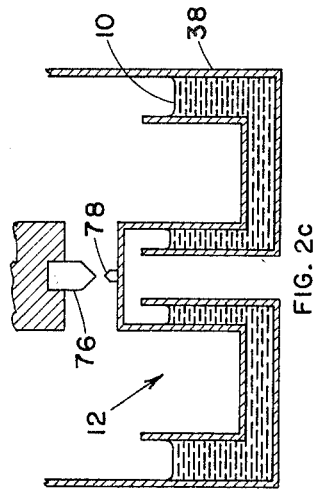
FIG. 2C is a material specimen support arrangement for a dilute solution.
Figure 2A:
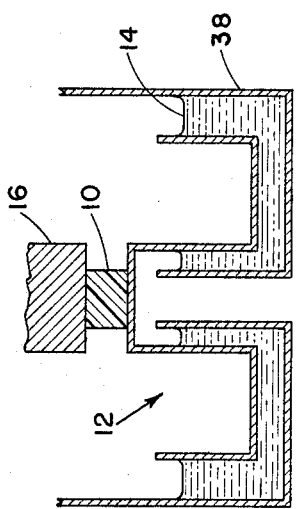
FIG. 2A is the material specimen support arrangement for a solid.
Figure 2B:
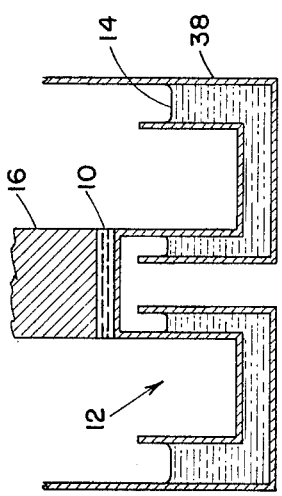
FIG. 2B is a material specimen support arrangement for a liquid.

Referring now to FIG. 2B, where the shear creep compliance of a liquid material is to be measured, enough of the material specimen 10 is placed on the float 12 to fill a gap approximately one millimetre high. This material specimen 10 is extruded from a syringe or a micrometer pipette onto the center of the float 12 and is allowed to flow out to the edge. With the coupling rod 50 clamped by the jewelers chuck assembly 45, the cylinder 16 is slowly lowered to a height where the liquid-air interface is vertical. The jewelers chuck assembly 45 around coupling rod 50 is then released. The liquid material specimen 10 will remain completely in the gap from hours to days before starting to flow out. Specimen surface tension provides the only required centering forces. The specimen height is also monitored for the liquids.

Referring to FIG. 2C, where relative viscosity measurements are desired for dilute solutions at very low shear rates, fluid sample 10 is placed in lower housing 38 replacing supporting fluid 14. Thus, the float 12 is now supported by fluid sample 10. Centering is provided by a pair of small magnets 76 and 78 placed on cylinder 16 and float 12, respectively. A torque is imparted by drive assembly 68 to float 12 imposing a shear force on fluid sample 10. Maximum shear rates of the order or magnitude of one reciprocal second are obtained with periods of revolution of approximately one to ten seconds.

Referring again to FIG. 1, the drive assembly 68 consists of four series coils 80, 80' (seen on FIG. 3), 82 and 82' (seen on FIG. 3) and two parallel coils 84 and 86 and two common laminated iron cores 88 and 90. Each iron core has attached thereto two series coils and a parallel coil. Disc 64 is suspended between the iron cores and above the series coils by the coupling rod 50.

Figure 3:
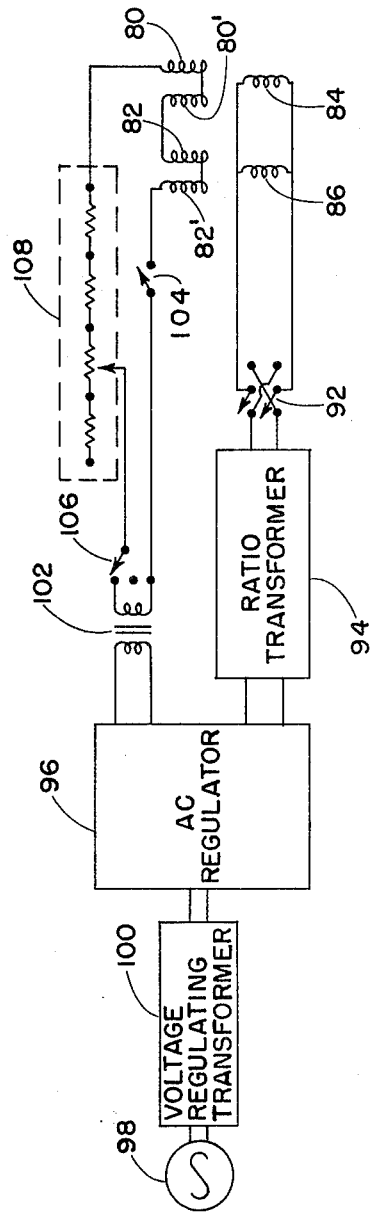
FIG. 3 is a schematic block diagram of the drive system employed in the instant invention.

Referring now to FIG. 3, wherein there is shown a schematic block diagram of the drive assembly 68, the parallel coils 84 and 86 are connected through phase reversal switch 92 to a ratio transformer 94 which is in turn connected to an A.C. regulator 96. The A.C. regulator 96 is in turn connected to an A.C. voltage source 98. The voltage source 98 can be a commercial voltage of 60 cycles per second with a 110–120 volt output. Interconnected between the voltage source 98 and the A.C. regulator 96 is a voltage regulating transformer 100. The series coils 80 and 82' are connected to a filament transformer 102 through a first and second switch 104 and 106. The filament transformer 102 is connected to A.C. regulator 96. Interconnected between coil 80 and switch 106 is variable resistance 108.

The resulting torque to the sample 10 is accomplished by applying voltages separately to the parallel coils 84 and 86 and the two pairs of series coils 80 and 80′, and 82 and 82′ to reduce the amount of accompanying voltage dissipation. An input voltage of 115 volts is supplied to the ratio transformer 94. The highly reproducible and variable output is applied to the parallel coils 84 and 86 through the phase reversal switch 92 to enable convenient phase changes and hence, torque reversal.

The output of the A.C. regulator 96 is supplied to a filament transformer 102 whose three or six volts are fed through variable resistance 108; however, most work can be done by maintaining a constant resistance and thus a constant current of about 3 amperes through the series coils 80, 80′, 82 and 82′. Holding the current constant through the series coils, the torque is changed by varying the setting of the transformer 94. The requirements of precision and consistency of power are met with the A.C. regulator 96. The voltage regulating transformer 100 prevents voltage spikes from reaching the A.C. regulator 96. It has been found necessary to prevent voltage spikes because regulator response time requires that it be preceded in the circuit by some means of eliminating rapid voltage fluctuations.

The interaction of eddy currents and an in-phase magnetic field alternately induced in the disc 62 by series coils 80 and 80′ and parallel coil 84, and series coils 82 and 82′ and parallel coil 86, respectively, produces the desired torque which is transmitted through the coupling rod 50 and float 12 to the specimen 10.

Absolute torque levels are determined with previously calibrated torsion wires. Discs of known moment inertia are used to measure the torsional strength of these wires in the normal manner.

While the invention described herein is described in detail in its present embodiments, it will be obvious to those skilled in the art after understanding the invention that various changes and modifications may be made therein without departing from the spirit or the scope thereof. It is the intention, therefore, to be limited only as indicated by the scope of the following claims.

What is claimed is:

1. An apparatus for impressing shear loading on a fluid sample of a dilute solution with a minimum of residual torque comprising housing means for containing the fluid sample, a float, said float being supported by the fluid sample, means for centering said float with respect to said housing, a coupling rod connected to said float, and drive means operatively connected to said coupling rod for generating a torque in said coupling rod where a shearing torsional force is imparted to the fluid sample.

2. An apparatus for impressing shear loading on a fluid sample of a dilute solution with a minimum of residual torque comprising a housing, a part of said housing being utilized for containing the fluid sample, a first magnet centrally located with respect to said housing, a float, said float being supported by the fluid sample, a second magnet secured to said float, said first and second magnets providing for centralization of said float with respect to said part of said housing, a coupling rod, said rod having one end thereof connected to said float, a plate, said plate being secured to the opposite end of said coupling rod, and drive means operatively connected so said plate for imparting a torsional force thereto whereby a shearing force is directed to the fluid sample.

3. An apparatus as in claim 2 wherein the drive means comprises a first coil connected in parallel with a second coil, a first transformer connected to said first and second coils, a phase reversal switch for connecting said first transformer to said first and second parallel coils, a regulated voltage source connected to said first transformer, a second transformer connected to said voltage source, third, fourth, fifth and sixth coils serially connected to said second transformer, a first core operatively connected to said first, third and fourth coils, a second core operatively connected to said second, fifth and sixth coils, said plate being suspended between said first and second cores above said serially connected third, fourth, fifth and sixth coils.

4. An apparatus for impressing shear loading on a material specimen with a minimum of residual torque comprising a first housing, said first housing including a container for containing a fluid, a second housing oppositely secured to said first housing, an adjustable member disposed in said second housing and centrally located therein, means for moving said adjustable member toward and away from said first housing, a float immersed in the fluid supply between said adjustable member and said container for carrying the material specimen whereby a constant specimen height may be maintained by moving said adjustable member while in contact with the material specimen, a coupling rod secured to said float, a disc, said disc being secured to the opposite end of said coupling rod and suspended thereby, means for alternately producing eddy currents and a magnetic field in said disc thereby imparting a rotational force thereto, and means for projecting the angle of rotation of said float relative to said adjustable member when the material specimen is in contact with said float and said adjustable member and said float is at an equilibrium level in said fluid.

5. An apparatus for impressing shear loading on a material specimen with a minimum of residual torque comprising a first housing, said first housing including a container for containing a fluid supply, a float immersed in the fluid supply for carrying the material specimen, a second housing oppositely secured to said first housing, a cylindrical adjustable member centrally located in said second housing, a threaded insert in said cylindrical member to adjust said cylindrical member toward and away from the material specimen on said float to maintain a constant specimen height, a coupling rod secured to said float, a disc, said disc secured to the opposite end of said coupling rod and being freely suspended thereby, a mirror secured to said coupling rod for reflecting a light beam therefrom, and drive means for alternately producing eddy currents and a magnetic field in said disc thereby imparting a rotational force thereto.

6. An apparatus as in claim 5 wherein the drive means comprises a first coil in parallel with a second coil, a first transformer connected to said first and second coils, switching means innerconnected parallel between first transformer and said first and second parallel coils, a voltage source connected to said first transformer, a second transformer connected to said voltage source, third, fourth, fifth, and sixth coils serially connected to said second transformer, a first core operatively connected to said first, third, and fourth coils, a second core operatively connected to said second, fifth and sixth coils, said disc being suspended between said first and second cores above said serially connected third, fourth, fifth and sixth coils.

7. An instrument for measuring the shear-creep compliance of a fluid sample of a dilute solution comprising a housing, a part of said housing being utilized for containing the fluid sample, a first magnet centrally located with respect to said housing, a float, said float being supported by the fluid sample, a second magnet secured to said float, said first and second magnets providing for centralization of said float with respect to said part of said housing, a coupling rod, said rod having one end thereof connected to said float, a plate, said plate being secured to the opposite end of said coupling rod, drive means operatively connected to said plate for imparting a torsional force thereto whereby a shearing force is directed to the fluid sample with a minimum of residual torque, and means for measuring the angle of twist of said float.

8. An apparatus for impressing shear loading on a material specimen with a minimum of residual torque comprising a first housing, said first housing including a container for containing a fluid supply, a float immersed in the fluid supply, a second housing oppositely secured to said first housing, a cylindrical adjustable member centrally located in said second housing, the material specimen being operatively secured between one end of said adjustable member and said float, a threaded insert in said cylindrical member to move said end of the cylindrical member toward and away from said float, means for monitoring the height of the material specimen when said cylindrical member is being moved so that said height may be maintained constant, a coupling rod secured to said float, a disc, said disc being secured to the opposite end of the coupling rod and being freely suspended thereby, a mirror secured to said coupling rod for reflecting a light beam therefrom, drive means for alternately producing eddy currents and a magnetic field in said disc thereby imparting a rotational force thereto for applying a torque to the material specimen and rotating said mirror.

References Cited by the Examiner

UNITED STATES PATENTS

| | | | |
|---|---|---|---|
| 831,794 | 5/1906 | Lohle | 308—9 |
| 1,327,838 | 1/1920 | Naylor | 73—99 X |
| 2,427,796 | 9/1047 | MacDonald | 73—99 X |
| 2,867,114 | 1/1959 | Mims | 73—91 |
| 3,105,381 | 10/1963 | Collette | 73—99 |

RICHARD C. QUEISSER, *Primary Examiner.*

G. M. GRON, CHARLES A. RUEHL,
*Assistant Examiners.*